United States Patent
Kwon et al.

(10) Patent No.: US 10,863,304 B2
(45) Date of Patent: Dec. 8, 2020

(54) SIGNAL PROCESSING APPARATUS FOR DETERMINING LOCATION OF MOBILE TERMINAL AND METHOD THEREOF

(71) Applicant: HYUNDAI MOBIS Co., Ltd., Seoul (KR)

(72) Inventors: Oh Jin Kwon, Seongnam-si (KR); Jae Kwon Kim, Yongin-si (KR); Byuck Jin Lee, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/585,828

(22) Filed: Sep. 27, 2019

(65) Prior Publication Data

US 2020/0169832 A1    May 28, 2020

(30) Foreign Application Priority Data

Nov. 28, 2018 (KR) .......................... 10-2018-0149817

(51) Int. Cl.
| | |
|---|---|
| *H04W 4/021* | (2018.01) |
| *H04W 4/80* | (2018.01) |
| *H04B 17/318* | (2015.01) |
| *B60R 25/20* | (2013.01) |

(52) U.S. Cl.
CPC .......... *H04W 4/021* (2013.01); *H04B 17/318* (2015.01); *H04W 4/80* (2018.02); *B60R 25/209* (2013.01)

(58) Field of Classification Search
CPC ........................... H04W 17/318; B60R 25/209
USPC ...................................................... 455/456.1
See application file for complete search history.

(56) References Cited

U.S. PATENT DOCUMENTS

| | | | |
|---|---|---|---|
| 8,639,640 B1* | 1/2014 | Kadous | G06N 20/00 706/12 |
| 10,493,981 B2 | 12/2019 | Lavoie et al. | |
| 2012/0092129 A1 | 4/2012 | Lickfelt | |
| 2017/0105101 A1* | 4/2017 | Santavicca | H04W 4/029 |
| 2018/0029560 A1* | 2/2018 | Mohaupt | B60N 2/002 |
| 2019/0202442 A1* | 7/2019 | Lavoie | B62D 1/00 |

FOREIGN PATENT DOCUMENTS

DE    10-2019-108862    10/2019

OTHER PUBLICATIONS

Office Action dated May 25, 2020, in German Patent Application No. 10 2019 129 138.0.

* cited by examiner

*Primary Examiner* — Anthony S Addy
*Assistant Examiner* — Farid Seyedvosoghi
(74) *Attorney, Agent, or Firm* — H.C. Park & Associates, PLC

(57) ABSTRACT

A method of determining a location of a mobile terminal location is provided. The method includes respectively receiving, by two antennas, first and second reception signals from the mobile terminal, calculating, by a communication module, a reception strength value (hereinafter referred to as RSSI_1) of the first reception signal and a reception strength value (hereinafter referred to as RSSI_2) of the second reception signal, and determining, by a location determination module, a region where the mobile terminal is located, based on a result obtained by comparing one RSSI of the RSSI_1 and the RSSI_2 with a reference value set based on a decision tree technique and a result obtained by comparing the one RSSI with a detailed reference value set based on a hysteresis technique.

8 Claims, 7 Drawing Sheets

R1: START AUTHENTICATION CONTROL REGION
R2: REMOTE PARKING CONTROL REGION
R3: REMOTE START CONTROL REGION OR
    RKE CONTROL REGION

US 10,863,304 B2

SIGNAL PROCESSING APPARATUS FOR DETERMINING LOCATION OF MOBILE TERMINAL AND METHOD THEREOF

CROSS-REFERENCE TO RELATED APPLICATIONS

This application claims priority under 35 U.S.C. § 119 to Korean Patent Application No. 10-2018-0149817, filed on Nov. 28, 2018, the disclosure of which is incorporated herein by reference in its entirety.

TECHNICAL FIELD

The present invention relates to a signal processing apparatus installed in a vehicle, and more particularly, to signal processing technology for determining a location of a terminal located outside a vehicle.

BACKGROUND

As terminals such as smartphones are popularized, various services using communication between a terminal and a vehicle are being provided. For example, a terminal communicates with a communication device of a vehicle, and thus, various services such as the start of vehicles, remote parking, and remote start are being provided.

A communication method between a terminal and a communication device of a vehicle may use, for example, Bluetooth communication, and vehicles include a communication device such as a Bluetooth communication module, for Bluetooth communication.

In the related art, a Bluetooth communication module installed in vehicles includes one antenna, and due to this, has a limitation in efficiently processing trilateration or triangulation for determining a location of a mobile terminal in a Bluetooth band (2.4 GHz) on the basis of only a received signal strength indicator (RSSI) of a reception signal received from a mobile phone (for example, a smartphone).

SUMMARY

Accordingly, the present invention provides a signal processing apparatus for determining a location of a terminal and a method thereof, which efficiently process a reception signal received from a mobile terminal so as to improve the location determination performance of a mobile terminal.

In one general aspect, a method of determining a location of a mobile terminal location and determining a region, where the mobile terminal is located, among a start authentication control region defined as an indoor region of a vehicle, a remote parking control region defined as an outdoor region outside the vehicle, and a remote start control region surrounding the remote parking control region, includes: respectively receiving, by two antennas, first and second reception signals from the mobile terminal; calculating, by a communication module, a reception strength value (hereinafter referred to as RSSI_1) of the first reception signal and a reception strength value (hereinafter referred to as RSSI_2) of the second reception signal; and determining, by a location determination module, a region where the mobile terminal is located, based on a result obtained by comparing one RSSI of the RSSI_1 and the RSSI_2 with a reference value set based on a decision tree technique and a result obtained by comparing the one RSSI with a detailed reference value set based on a hysteresis technique.

In another general aspect, a signal processing apparatus for determining a location of a mobile terminal location and determining a region, where the mobile terminal is located, among a start authentication control region defined as an indoor region of a vehicle, a remote parking control region defined as an outdoor region outside the vehicle, and a remote start control region surrounding the remote parking control region, includes: an antenna unit including first and second antennas respectively receiving first and second reception signals from the mobile terminal; a communication module configured to calculate a reception strength value (hereinafter referred to as RSSI_1) of the first reception signal and a reception strength value (hereinafter referred to as RSSI_2) of the second reception signal; and a location determination module configured to determine a region where the mobile terminal is located, based on a determination value generated by using a result obtained by comparing one RSSI of the RSSI_1 and the RSSI_2 with a reference value set based on a decision tree technique and a result obtained by comparing the one RSSI with a detailed reference value set based on a hysteresis technique.

Other features and aspects will be apparent from the following detailed description, the drawings, and the claims.

DETAILED DESCRIPTION OF EMBODIMENTS

Figure 1:
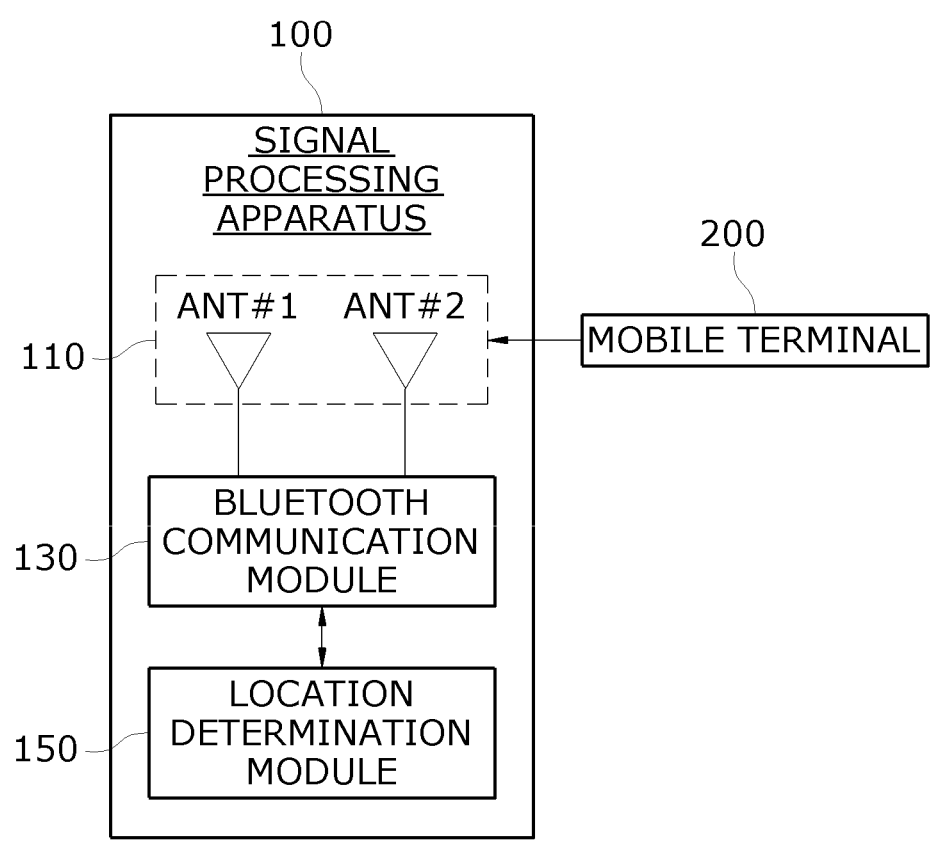
FIG. 1 is a block diagram of a signal processing apparatus according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

Hereinafter, a signal processing apparatus according to an embodiment of the present invention will be described with reference to the accompanying drawings.

Figure 2:
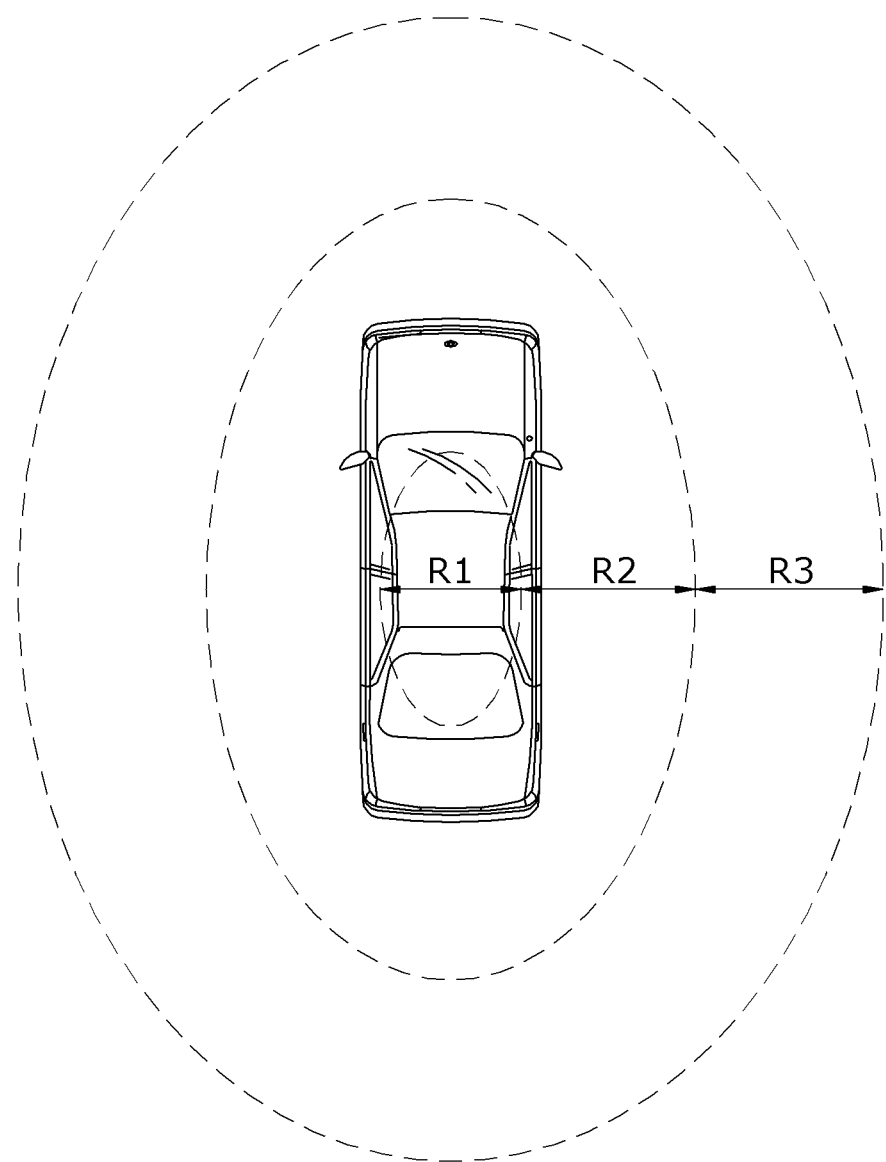
FIG. 2 is a diagram for describing vehicle control based on a region where a mobile terminal is located with respect to the vehicle, according to an embodiment of the present invention.

FIG. 1 is a block diagram of a signal processing apparatus 100 according to an embodiment of the present invention, and FIG. 2 is a diagram for describing vehicle control based on a region where a mobile terminal is located with respect to the vehicle, according to an embodiment of the present invention.

Referring to FIG. 1, the signal processing apparatus 100 according to an embodiment of the present invention may be installed in a vehicle and may perform wireless communication with a mobile terminal 200 of a user. The wireless communication is not limited, but for convenience of description, the wireless communication may be assumed as Bluetooth communication.

The user may perform vehicle control such as start authentication control, remote parking control, remote keyless entry (RKE) control, and remote start control by using the mobile terminal 200 capable of performing wireless communication with the signal processing apparatus 100.

The start authentication control may be vehicle control which is performed based on a reception signal received from the mobile terminal 200 located in a start authentication control region R1 illustrated in FIG. 2, and for example, may denote vehicle control which is performed according to a start switch button (SSB) being pressed by the user who is stepping on a brake pedal in a vehicle indoor region R1 with possessing the mobile terminal 200.

The remote parking control may be vehicle control which is performed based on a reception signal received from the mobile terminal 200 located in a remote parking control region R2 illustrated in FIG. 2, and for example, may denote vehicle control which is performed based on execution of an application associated with remote parking and installed in the mobile terminal 200 at a distance of about 5 m or less with respect to an outer portion of a vehicle.

The RKE control may be vehicle control which is performed based on a reception signal received from the mobile terminal 200 located in an RKE control region R3 illustrated in FIG. 2, and for example, may denote vehicle control which is performed based on execution of an application associated with an RKE function and installed in the mobile terminal 200 at a distance of about 30 m or less with respect to an outer portion of a vehicle. Here, the RKE function may include, for example, door lock/unlock, panic start/stop, and trunk open/close.

The remote start control may be vehicle control which is performed based on a reception signal received from the mobile terminal 200 located in a remote start control region R3 illustrated in FIG. 2 like the RKE control, and for example, may denote vehicle control which is performed based on execution of an application associated with remote start and installed in the mobile terminal 200.

The signal processing apparatus 100 according to an embodiment of the present invention may use two antennas which are installed to have a 90-degree phase difference, and thus, may efficiently receive a reception signal from the mobile terminal 200.

Moreover, the signal processing apparatus 100 according to an embodiment of the present invention may determine a region where the mobile terminal 200 is located, based on a decision tree technique, instead of determining a region, where the mobile terminal 200 is located, of three regions R1 to R3 according to conventional trilateration or triangulation by using an RSSI of the received reception signal.

Moreover, by using a hysteresis technique, the signal processing apparatus 100 according to an embodiment of the present invention may prevent a location determination error which can occur when the mobile terminal 200 is located at a boundary between regions.

To this end, as illustrated in FIG. 1, the signal processing apparatus 1 may include an antenna unit 110, a Bluetooth communication unit 130, and a location determination module 150.

The antenna unit 110 may receive a reception signal of a Bluetooth band (2.4 GHz) from the mobile terminal 200. In this case, in order to efficiently receive the reception signal from the mobile terminal 200, the antenna unit 110 may include a first antenna ANT #1 and a second antenna ANT #2 which have a 90-degree phase difference therebetween. Therefore, the antenna unit 110 may receive a first reception signal through the first antenna ANT #1 and a second reception signal through the second antenna ANT #2.

In an embodiment of the present invention, by using two antennas ANT #1 and ANT #2 having a 90-degree phase difference, the antenna unit 110 may complement a null point of each of the first antenna ANT #1 and the second antenna ANT #2 to effectively receive an RSSI of each of the first and second reception signals from the mobile terminal 200.

The Bluetooth communication module 130 may perform filtering of noise included in the first and second reception signals from the mobile terminal 200 through the antenna unit 110, calculation of the RSSI of each of the first and second reception signals, and encoding/decoding. Here, a low pass filter (LPF) may be used for filtering the first and second reception signals. The reason that the low pass filter is used is because noise having a radio frequency (RF) is noise of a high frequency band.

The location determination module 150 may compare a reception strength RSSI_1 of the first reception signal and a reception strength RSSI_2 of the second reception signal, which are input from the Bluetooth communication module 130, with the reference value set based on the decision tree technique to determine a region, where the mobile terminal 200 is located, among the start authentication control region R1, the remote parking control region R2, and the remote start control region or RKE control region R3.

Moreover, the location determination module 150 may further compare the reception strength RSSI_1 of the first reception signal and the reception strength RSSI_2 of the second reception signal with the detailed reference value set based on the hysteresis technique to again determine the region which is determined through the comparison with the reference value set based on the decision tree technique.

Hereinafter, the location determination module 150 will be described in detail with reference to FIG. 3.

Figure 3:
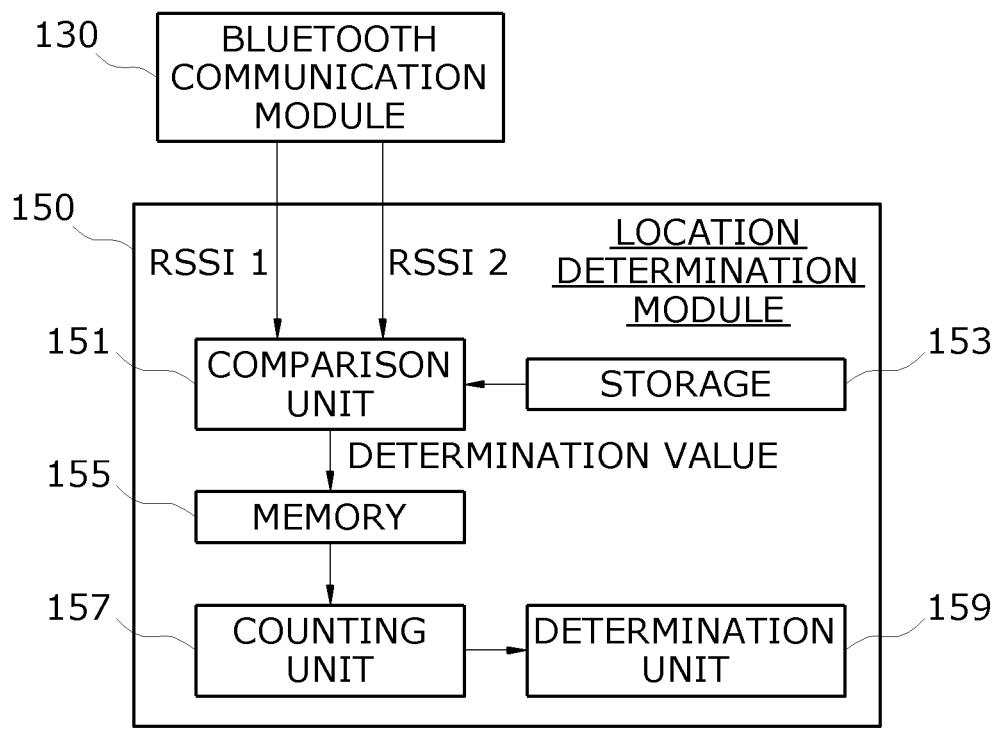
FIG. 3 is a block diagram of a location determination module illustrated in FIG. 1.

FIG. 3 is a block diagram of the location determination module 150 illustrated in FIG. 1.

Referring to FIG. 3, the location determination module 150 may include a comparison unit 151, a storage 153, a memory 155, a counting unit 157, and a determination unit 159.

The comparison unit 151 may compare the reception strength RSSI_1 of the first reception signal and the reception strength RSSI_2 of the second reception signal, which are input from the Bluetooth communication module 130, with a reference value stored in the storage 153 and may output a determination value based on a result of the comparison.

The reference value stored in the storage 153 may include a reference value based on the decision tree technique and a detailed reference value based on the hysteresis technique. The reference value based on the decision tree technique may include a first reference value −AdB for determining a start authentication control region and a second reference value −CdB for determining a remote parking control region. The detailed reference value based on the hysteresis technique may include a first detailed reference value −BdB representing an allowable error of the first reference value −AdB and a second detailed reference value −DdB representing an allowable error of the second reference value −CdB.

The comparison unit 151 may perform a five-step comparison process by using the reference value based on the decision tree technique and the detailed reference value based on the hysteresis technique.

In detail, in a first step, a process of comparing RSSI_1 or RSSI_2 with the first reference value −AdB based on the decision tree technique to determine whether the RSSI_1 or RSSI_2 is equal to or greater than the first reference value −AdB may be performed. For example, when the RSSI_1 or RSSI_2 is equal to or greater than the first reference value −AdB, the comparison unit 151 may determine that the mobile terminal 200 is located in the start authentication control region R1 (an indoor space of a vehicle), and when the RSSI_1 or RSSI_2 is less than the first reference value −AdB, a second step may be performed.

Figure 4:
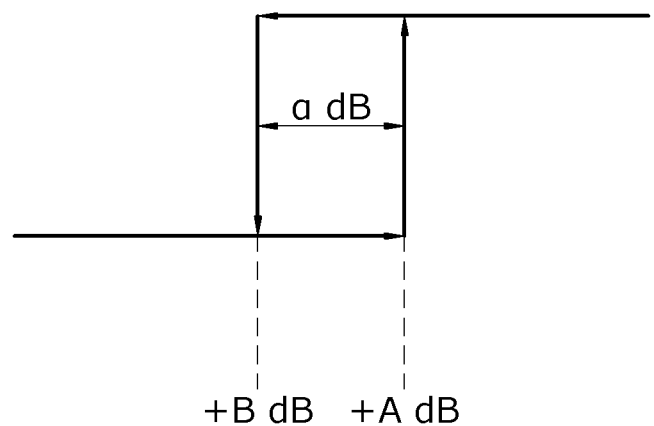
FIG. 4 is a diagram illustrating an example where a reference value and a detailed reference value according to an embodiment of the present invention are shown on a hysteresis curve.

In the second step, a process of comparing RSSI_1 or RSSI_2 with the first detailed reference value −BdB based on the hysteresis technique to determine whether the RSSI_1 or RSSI_2 less than the first detailed reference value −BdB is equal to or greater than the first detailed reference value −BdB may be performed. For example, when the RSSI_1 or RSSI_2 less than the first reference value −AdB is equal to or greater than the first detailed reference value −BdB, the comparison unit 151 may determine that the mobile terminal 200 is still located in the start authentication control region (an indoor space of a vehicle). An example where the first reference value −AdB and the first detailed reference value −BdB are shown on a hysteresis curve is as shown in FIG. 4. An interval between the first reference value −AdB and the first detailed reference value −BdB may be α, and α may be variously changed (for example, α may be 5 dB). That is, when the RSSI_1 or RSSI_2 is within a range where a buffer period (an allowable error range) equal to 5 dB is set with respect to −AdB, the mobile terminal 200 may be determined as being located in the start authentication control region R1. In this manner, the first detailed reference value −BdB which defines an allowable error of the first reference value −AdB may be set, thereby preventing a location determination error from occurring in a boundary between the start authentication control region R1 and the remote parking control region R2. When the RSSI_1 or RSSI_2 less than the first reference value −AdB is less than the first detailed reference value −BdB, a third step may be performed.

In the third step, a process of comparing RSSI_1 or RSSI_2 with the second reference value −CdB based on the decision tree technique to determine whether the RSSI_1 or RSSI_2 less than the first detailed reference value −BdB is equal to or greater than the second reference value −CdB may be performed. For example, when the RSSI_1 or RSSI_2 less than the first detailed reference value −BdB is equal to or greater than the second reference value −CdB, the comparison unit 151 may determine that the mobile terminal 200 is located in the remote parking control region R2, and when the RSSI_1 or RSSI_2 less than the first detailed reference value −BdB is less than the second reference value −CdB, a fourth step may be performed.

In the fourth step, a process of comparing RSSI_1 or RSSI_2 with the second detailed reference value −DdB to determine whether the RSSI_1 or RSSI_2 less than the second reference value −CdB is equal to or greater than the second detailed reference value −DdB may be performed. For example, when the RSSI_1 or RSSI_2 less than the second reference value −CdB is equal to or greater than the second detailed reference value −DdB, the comparison unit 151 may determine that the mobile terminal 200 is located in the remote parking control region R2, and when the RSSI_1 or RSSI_2 less than the second reference value −CdB is less than the second detailed reference value −DdB, a fifth step may be performed.

In the fifth step, the comparison unit 151 may determine whether all of the RSSI_1 and the RSSI_2 are zero. For example, when the RSSI_1 or the RSSI_2 is not zero, the comparison unit 151 may determine that the mobile terminal 200 is located in the remote start control region/RKE control region R3, and when all of the RSSI_1 and the RSSI_2 are zero, the comparison unit 151 may determine that a Bluetooth communication connection is disconnected.

The comparison unit 151 may repeat a process including the first to fifth steps N (where N is an integer of 2 or more) times and may output N number of results (hereinafter referred to as a determination value) which are obtained by repeating the process N times. Here, N may be variously changed, and for example, may be 10. In this case, the comparison unit 151 may repeat the process including the first to fifth steps ten times and may output determination values which are obtained by repeating the process ten times.

The memory 155 may store N number of determination values which are obtained by repeating the process including the first to fifth steps N times. The memory 155 may be a volatile memory or a non-volatile memory.

The counting unit 157 may count the number of determination values (hereinafter referred to as the number of determination values of R1) where the mobile terminal 200 is determined as being located in the start authentication control region R1, the number of determination values (hereinafter referred to as the number of determination values of R2) where the mobile terminal 200 is determined as being located in the remote parking control region R2, and the number of determination values (hereinafter referred to as the number of determination values of R3) where the mobile terminal 200 is determined as being located in the remote start control region R3 (or the RKE control region), in the N determination values stored in the memory 155, and may transfer a counting value to the determination unit 159.

The determination unit 159 may finally determine a region where the mobile terminal 200 is currently located, based on the counting value transferred from the counting unit 157.

For example, when the number of determination values of R1 is equal to or greater than a first reference number COUNT1, the determination unit 159 may finally determine that the mobile terminal 200 is currently located in the start authentication control region R1, and when the number of determination values of R2 is equal to or greater than a second reference number COUNT2, the determination unit 159 may finally determine that the mobile terminal 200 is currently located in the remote parking control region R2. Also, when the number of determination values of R3 is equal to or greater than a third reference number COUNT3, the determination unit 159 may finally determine that the mobile terminal 200 is currently located in the remote start control region R3 or the RKE control region R3.

The first to third reference numbers COUNT1 to COUNT3 may be variously changed based on a design and may be set to have a large or small relationship such as "COUNT1<COUNT2<COUNT3". The reason that the third reference number COUNT3 is set to be largest is because the remote start control region R3 is farthest away from a vehicle and thus is largest affected by noise. That is, the third reference number COUNT3 may be set to be highest, and thus, a determination error caused by an influence of noise may be minimized. The present embodiment is not limited, and in a case where the comparison unit 151 outputs ten determination values, COUNT1, COUNT2, and COUNT3 may be sequentially set to 7, 8, and 9.

Figure 5:
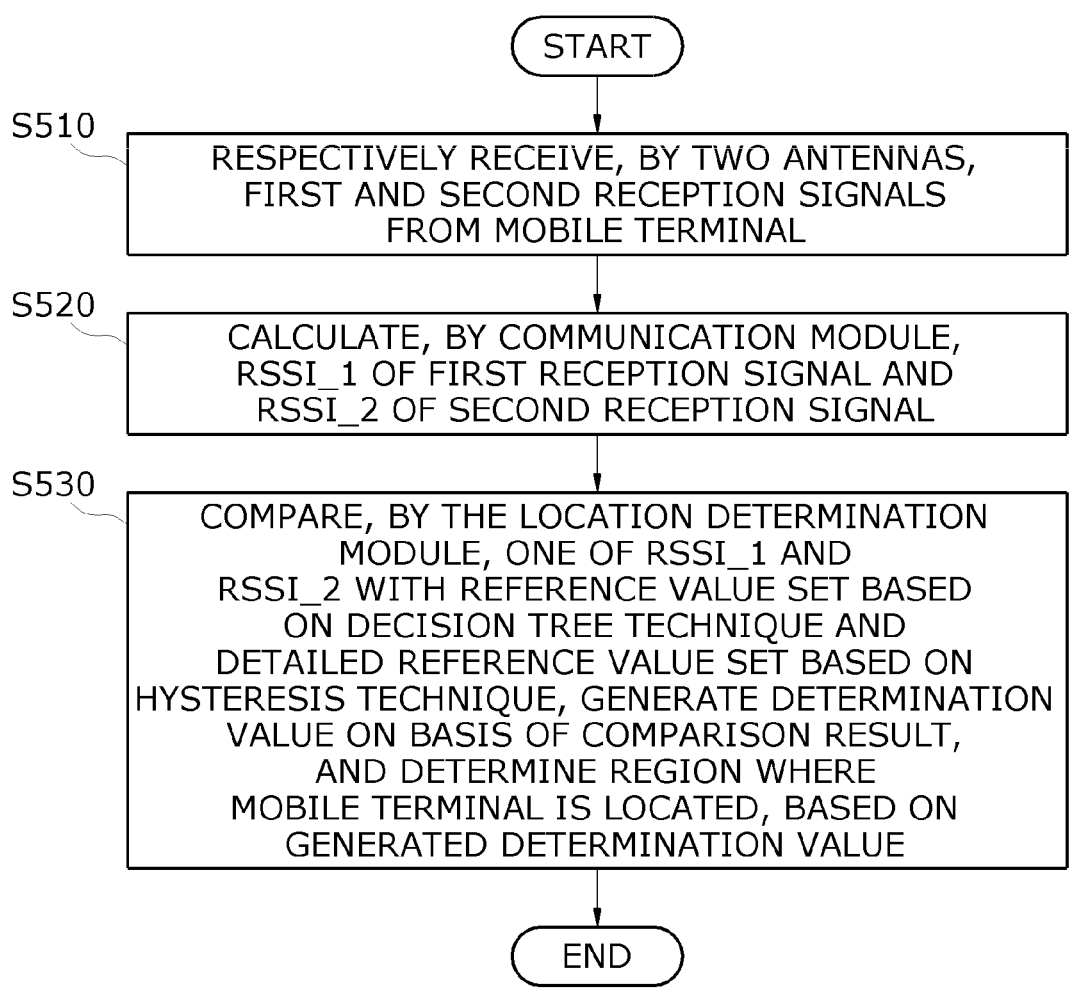
FIG. 5 is a flowchart illustrating a method of determining a location of a mobile terminal, according to an embodiment of the present invention.

FIG. 5 is a flowchart illustrating a method of determining a location of a mobile terminal, according to an embodiment of the present invention. To help understand description, the method of determining a location of a mobile terminal will be described with reference to FIG. 5 in conjunction with FIGS. 1 to 4. However, for conciseness of description, descriptions which are the same as or similar to descriptions given above with reference to FIGS. 1 to 4 will be briefly given or are omitted.

First, referring to FIG. 5, the method of determining a location of a mobile terminal according to an embodiment of the present invention may include a plurality of steps of determining a region, where the mobile terminal 200 is located, among the start authentication control region R1 defined as an indoor region of a vehicle, the remote parking control region R2 defined as an outdoor region outside the vehicle, and the remote start control region R3 surrounding the remote parking control region R2.

In detail, in step S510, a process of respectively receiving, by two antennas ANT #1 and ANT #2, first and second reception signals from the mobile terminal 200 may be performed. In this case, in order to efficiently receive the first and second reception signals from the mobile terminal 200, the two antennas ANT #1 and ANT #2 may be installed to have a 90-degree phase difference therebetween.

Subsequently, in step S520, a process of calculating (measuring), by the communication module 130, a reception strength value (hereinafter referred to as RSSI_1) of the first reception signal and a reception strength value (hereinafter referred to as RSSI_2) of the second reception signal may be performed.

Subsequently, in step S530, a process of comparing, by the location determination module 150, one of the RSSI_1 and the RSSI_2 with a reference value set based on the decision tree technique and a detailed reference value set based on the hysteresis technique, generating a determination value on the basis of a result of the comparison, and determining a region R1, R2, or R3, where the mobile terminal 200 is located, on the basis of the generated determination value may be performed.

According to an embodiment, a process performed in step S530 may be a process of comparing the one RSSI with the detailed reference value representing an allowable error of the reference value to determine the determination value and determining a region, where the mobile terminal 200 is located, on the basis of the generated determination value.

According to an embodiment, a process performed in step S530 may be a process of comparing the one RSSI with the reference value, including the first reference value −AdB for determining whether the mobile terminal 200 is located in the start authentication control region R1 and the second reference value −CdB for determining whether the mobile terminal 200 is located in the remote parking control region R2, to determine the determination value and determining a region, where the mobile terminal 200 is located, on the basis of the generated determination value.

According to an embodiment, the reference value may include a first reference value A for determining whether the mobile terminal 200 is located in the start authentication control region R1, a second reference value C for determining whether the mobile terminal 200 is located in the remote parking control region R2, and a third reference value E for determining whether the mobile terminal 200 is located in the remote start control region R3, and the detailed reference value may include a first detailed reference value B representing an allowable error of the first reference value A and a second detailed reference value D representing an allowable error of the second reference value C. Here, a large or small relationship between the first and second reference values and the first and second detailed reference values may be A>B>C>D, and the third reference value may be zero.

Figure 6:
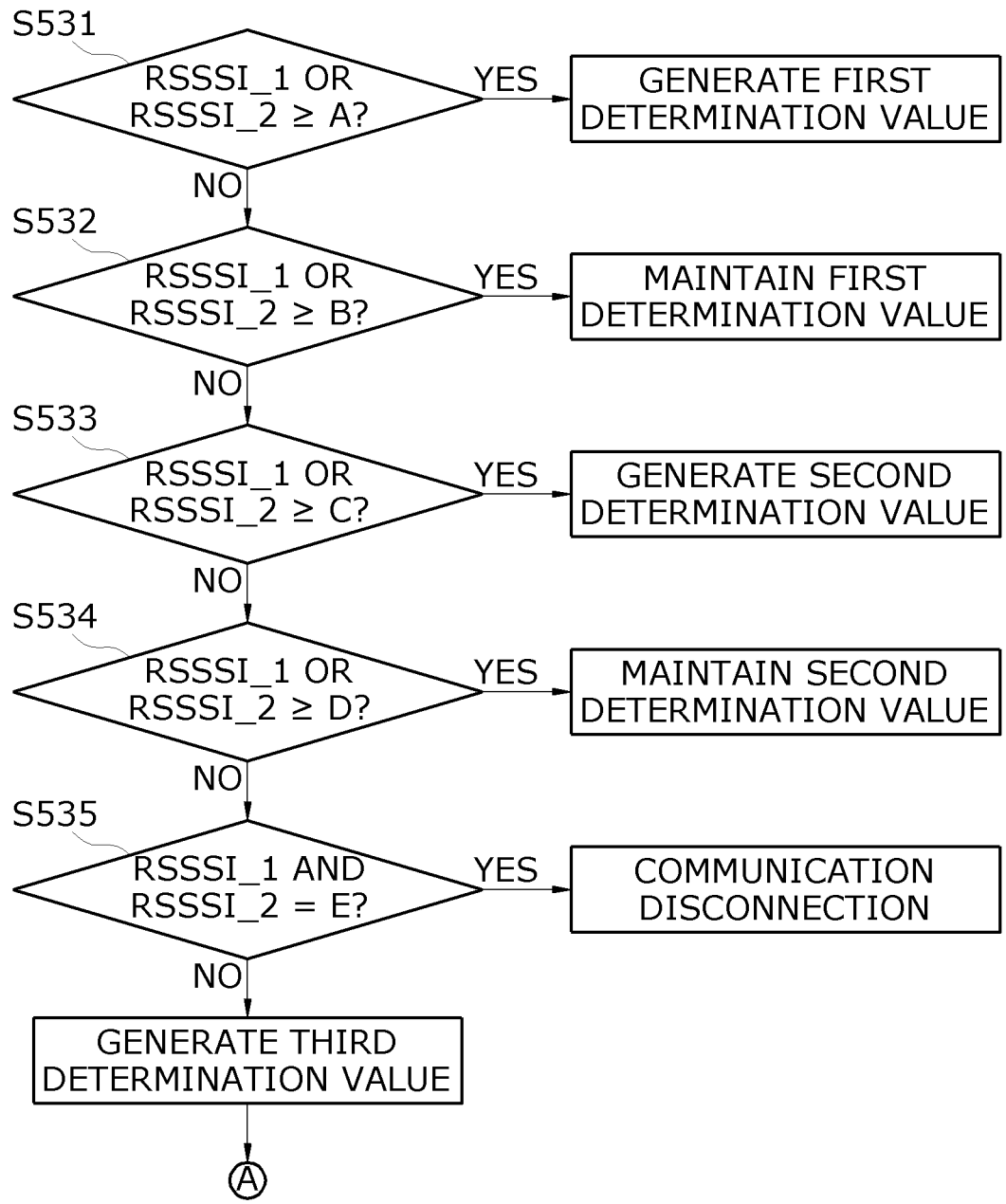
FIGS. 6 and 7 are detailed flowcharts of step S530 illustrated in FIG. 5.
Figure 7:
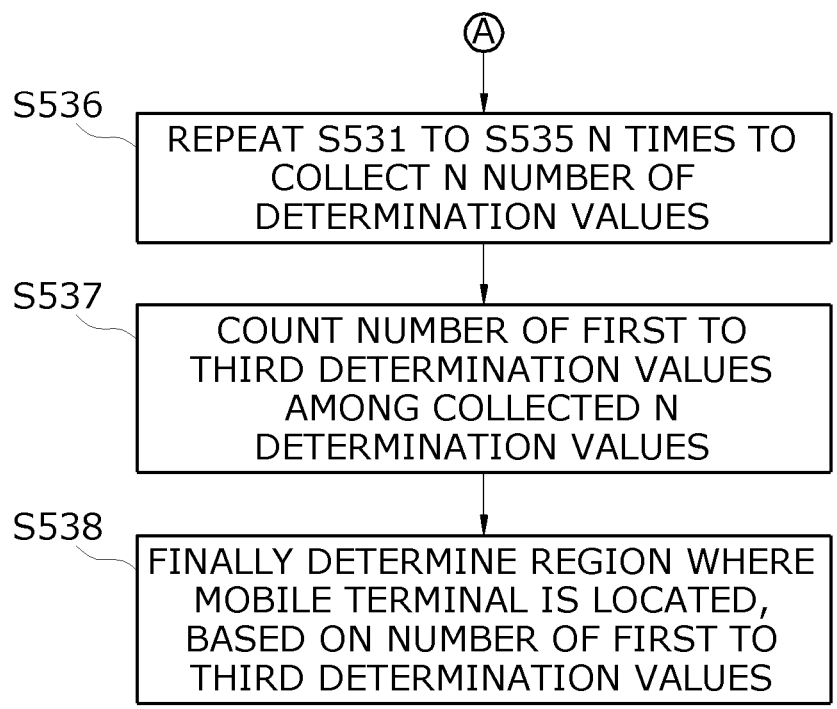

FIGS. 6 and 7 are detailed flowcharts of step S530 illustrated in FIG. 5.

Referring to FIG. 6, first, in step S531, the location determination module 150 or a comparison unit (151 of FIG. 3) may compare a first reference value A or −AdB set based on the decision tree technique with one of the reception strength value (hereinafter referred to as RSSI_1) of the first reception signal and the reception strength value (hereinafter referred to as RSSI_2) of the second reception signal which have been calculated in step S520 and may generate a first determination value representing that the mobile terminal 200 is located in a start authentication control region (R1 of FIG. 2), based on a result of the comparison. For example, when the RSSI_1 or the RSSI_2 is equal to or greater than the first reference value A or −AdB, the location determination unit 150 may generate the first determination value and may store the first determination value in a memory (155 of FIG. 3). On the other hand, when all of the RSSI_1 and the RSSI_2 are less than the first reference value A or −AdB, step S532 may be performed.

Subsequently, in step S532, the location determination module 150 may compare the RSSI_1 or the RSSI_2 with a first detailed reference value B or −BdB set based on the hysteresis technique, and based on a result of the comparison, the location determination module 150 may maintain the first determination value which has been generated in step S531 or may perform step S533. For example, when the RSSI_1 or the RSSI_2 is equal to or greater than the first detailed reference value B or −BdB, the location determination module 150 may maintain the first determination value which has been generated in step S531, and when the RSSI_1 and the RSSI_2 are less than the first detailed reference value B or −BdB, the location determination module 150 may perform step S533. Here, a process of performing step S532 may be for that a buffer period (i.e., an allowable error range) is set for reducing a location determination error occurring in a boundary between the start authentication control region R1 and the remote parking control region, and when the RSSI_1 or the RSSI_2 is within the allowable error range, the mobile terminal is determined as being located in the start authentication control region despite that a condition of step S531 is not satisfied.

Subsequently, in step S533, when the RSSI_1 or the RSSI_2 is less than the first detailed reference value B or −BdB, the location determination module 150 or the comparison unit (151 of FIG. 3) may compare the RSSI_1 or the RSSI_2 with a second reference value C or −CdB set based on the decision tree technique and may generate a second determination value representing that the mobile terminal 200 is located in the remote parking control region R2, based on a result of the comparison. For example, when the RSSI_1 or the RSSI_2 is equal to or greater than the second reference value C or −CdB, the location determination module 150 may maintain the second determination value, and when the RSSI_1 and the RSSI_2 are less than the second reference value C or −CdB, the location determination module 150 may perform step S534.

Subsequently, in step S534, when the RSSI_1 and the RSSI_2 are less than the second reference value C or −CdB, the location determination module 150 or the comparison unit (151 of FIG. 3) may compare the RSSI_1 or the RSSI_2 with a second detailed reference value D or −DdB, and based on a result of the comparison, the location determination module 150 may maintain the second determination value which has been generated in step S533 or may perform step S535. For example, when the RSSI_1 or the RSSI_2 is equal to or greater than the second detailed reference value D or −DdB, the location determination module 150 may maintain the second determination value, and when the RSSI_1 and the RSSI_2 are less than the second detailed reference value D or −DdB, the location determination module 150 may perform step S535. Here, a process of performing step S534 may be for that a buffer period (i.e., an allowable error range) is set for reducing a location determination error occurring in a boundary between the remote parking control region R2 and the remote start control region R3, and when the RSSI_1 or the RSSI_2 is within the allowable error range, the mobile terminal is determined as being located in the remote parking control region R2 despite that a condition of step S533 is not satisfied.

Subsequently, in step S535, when the RSSI_1 and the RSSI_2 are less than the second detailed reference value D or −DdB, the location determination module 150 or the comparison unit (151 of FIG. 3) may compare the RSSI_1 and the RSSI_2 with the third reference value E, and based on a result of the comparison, the location determination module 150 may generate a third determination value representing that the mobile terminal 200 is located in the remote start control region R3. Here, the third reference value may be zero. In this case, when the RSSI_1 or the RSSI_2 is not zero, the location determination module 150 may generate the third determination value representing that the mobile terminal 200 is located in the remote start control region R3, and when the RSSI_1 and the RSSI_2 are zero, the location determination module 150 may determination a communication disconnection and may not generate any determination value.

Subsequently, in step S536, the location determination module 150 or the comparison unit (151 of FIG. 3) may repeat a process including steps S531 to S535 N times, generate N number of determination values by repeating the process N times, and may store and collect the generated N determination values in a memory (155 of FIG. 3). In this case, when a condition of step S535 is not satisfied, namely, when a communication disconnection occurs, a determination value may not be generated, and thus, in this case, the process including steps S531 to S535 may be additionally repeated until a determination value is generated.

Subsequently, in step S537, the location determination module 150 or a counting unit (157 of FIG. 3) may count the number of first to third determination values among the collected N determination values.

Subsequently, in step S538, the location determination module 150 or a determination unit (159 of FIG. 3) may finally determine a region where the mobile terminal is located, based on the counted number of first to third determination values. This will be described below in detail with reference to FIG. 8.

Figure 8:
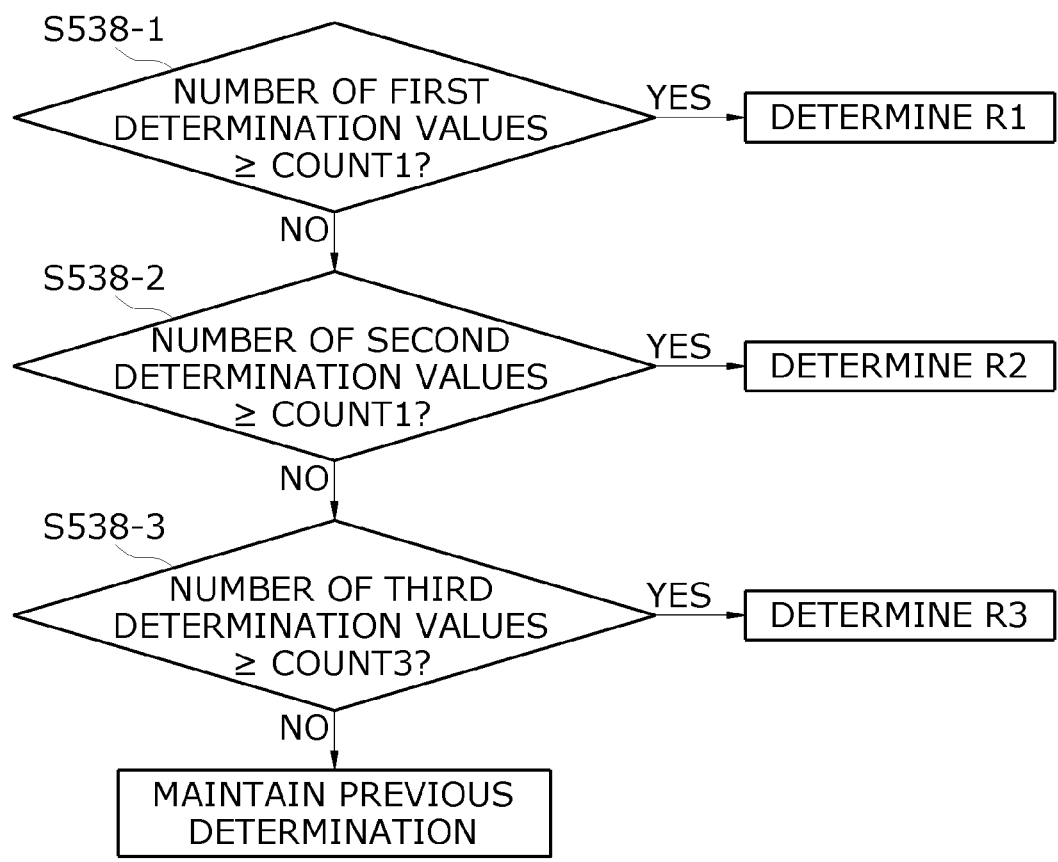
FIG. 8 is a detailed flowchart of step S538 illustrated in FIG. 7.

FIG. 8 is a detailed flowchart of step S538 illustrated in FIG. 7.

Referring to FIG. 8, first, in step S538-1, the location determination unit 150 or the determination unit 159 may compare the first reference number COUNT1 with the number of first determination values which have been counted in step S537, and based on a result of the comparison, the location determination unit 150 or the determination unit 159 may finally determine that the mobile terminal 200 is located in the start authentication control region R1. For example, when the number of first determination values is equal to or greater than the first reference number COUNT1, the location determination unit 150 or the determination unit 159 may finally determine that the mobile terminal 200 is located in the start authentication control region R1, and otherwise, step S538-2 may be performed.

In step S538-2, the location determination unit 150 or the determination unit 159 may compare the second reference number COUNT2 with the number of second determination values which have been counted in step S537, and based on a result of the comparison, the location determination unit 150 or the determination unit 159 may finally determine that the mobile terminal 200 is located in the remote parking control region R2. For example, when the number of second determination values is equal to or greater than the second reference number COUNT2, the location determination unit 150 or the determination unit 159 may finally determine that the mobile terminal 200 is located in the remote parking control region R2, and otherwise, step S538-3 may be performed.

In step S538-3, the location determination unit 150 or the determination unit 159 may compare the third reference number COUNT3 with the number of third determination values which have been counted in step S537, and based on a result of the comparison, the location determination unit 150 or the determination unit 159 may finally determine that the mobile terminal 200 is located in the remote start control region R3. For example, when the number of third determination values is equal to or greater than the third reference number COUNT3, the location determination unit 150 or the determination unit 159 may finally determine that the mobile terminal 200 is located in the remote start control region R3, and otherwise, a previous determination result may be maintained.

A large or small relationship between the first to third reference numbers COUNT1 to COUNT3 compared with the determination values generated in the steps may be COUNT1<COUNT2<COUNT3. As described above, the reason that the third reference number COUNT3 is set to be largest is because the remote start control region R3 is farthest away from a vehicle and thus is largest affected by noise. Accordingly, since the third reference number COUNT3 is set to be highest, a determination error caused by an influence of noise may be minimized.

According to the embodiments of the present invention, by using two antennas having a 90-degree phase difference, a reception signal may be efficiently received from the mobile terminal 200. Also, instead of determining a region, where the mobile terminal 200 is located, of three regions R1 to R3 according to conventional trilateration or triangulation by using signal strengths RSSI_1 and RSSI_2 of the received reception signal, a location determination error occurring in determining a region where the mobile terminal 200 is located may be minimized by using the decision tree technique and the hysteresis technique.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of determining a location of a mobile terminal, the method comprising:
   respectively receiving, by two antennas, first and second reception signals from the mobile terminal;
   calculating, by a communication module, a reception strength value (RSSI_1) of the first reception signal and a reception strength value (RSSI_2) of the second reception signal; and
   determining, by a location determination module, a region where the mobile terminal is located, based on a result (A) obtained by comparing one RSSI of the RSSI_1 and the RSSI_2 with a reference value set based on a decision tree technique and a result (B) obtained by comparing the one RSSI with a detailed reference value representing an allowable error of the reference value set based on a hysteresis technique, wherein the determining further comprises:
   generating determination values representing that the mobile terminal is located in a start authentication control region, determination values representing that the mobile terminal is located in a remote parking control region and determination values representing that the mobile terminal is located in a remote start control region surrounding the remote parking control region, based on the results (A) and (B);
   counting a number of the determination values; and
   finally determining the location of the mobile terminal, based on a result obtained by comparing the number of the determination values with a reference number for determining a region in which the mobile terminal is located, among the start authentication control region, a remote parking control region, and the remote start control region.

2. The method of claim 1, wherein the receiving comprises receiving the first and second reception signals through the two antennas having a 90-degree phase difference.

3. The method of claim 1, wherein the reference value comprises first to third reference values, and the determining comprises comparing the one RSSI with a first reference value A for determining whether the mobile terminal is located in the start authentication control region and a second reference value C for determining whether the mobile terminal is located in the remote parking control region and determining a region where the mobile terminal is located, based on a determination value generated from a result of the comparison.

4. The method of claim 1, wherein the determining comprises comparing the one RSSI with the detailed reference value representing an allowable error of the reference value to generate a determination value and determining a region where the mobile terminal is located, based on the determination value.

5. A signal processing apparatus for determining a location of a mobile terminal, the signal processing apparatus comprising:
   an antenna unit including first and second antennas respectively receiving first and second reception signals from the mobile terminal;
   a communication module configured to calculate a reception strength value (RSSI_1) of the first reception signal and a reception strength value (RSSI_2) of the second reception signal; and
   a location determination module configured to determine a region where the mobile terminal is located, based on a determination value generated by using a result (A) obtained by comparing one RSSI of the RSSI_1 and the RSSI_2 with a reference value set based on a decision tree technique and a result (B) obtained by comparing the one RSSI with a detailed reference value representing an allowable error of the reference value set based on a hysteresis technique,
   wherein the location determination module is further configured to:
   generate determination values representing that the mobile terminal is located in a start authentication control region, determination values representing that the mobile terminal is located in a remote parking control region and determination values representing that the mobile terminal is located in a remote start control region surrounding the remote parking control region, based on the results (A) and (B);
   count a number of the determination values; and
   finally determine the location of the mobile terminal, based on a result obtained by comparing the number of the determination values with a reference number for determining a region in which the mobile terminal is located, among the start authentication control region, a remote parking control region, and the remote start control region.

6. The signal processing apparatus of claim 5, wherein the first and second antennas have a 90-degree phase difference.

7. The signal processing apparatus of claim 5, wherein the location determination module compares the one RSSI with a first reference value for determining whether the mobile terminal is located in the start authentication control region and a second reference value for determining whether the mobile terminal is located in the remote parking control region and determines a region where the mobile terminal is located, based on the determination value generated from a result of the comparison.

8. The signal processing apparatus of claim 5, wherein the location determination module compares the one RSSI with the detailed reference value representing an allowable error of the reference value to generate the determination value and determines a region where the mobile terminal is located, based on the determination value.

* * * * *